May 6, 1969  F. A. BRAWNER ET AL  3,442,151
REMOTE CONTROL APPARATUS
Filed June 12, 1967
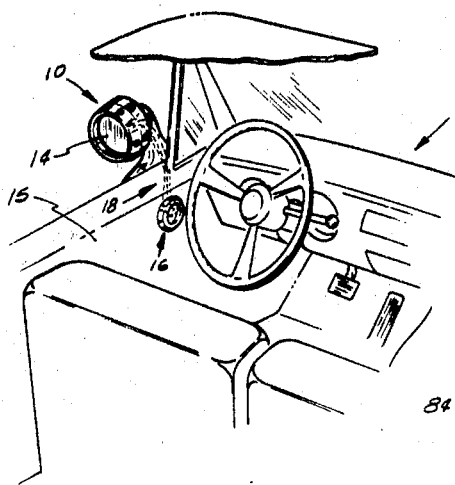
FIG.1
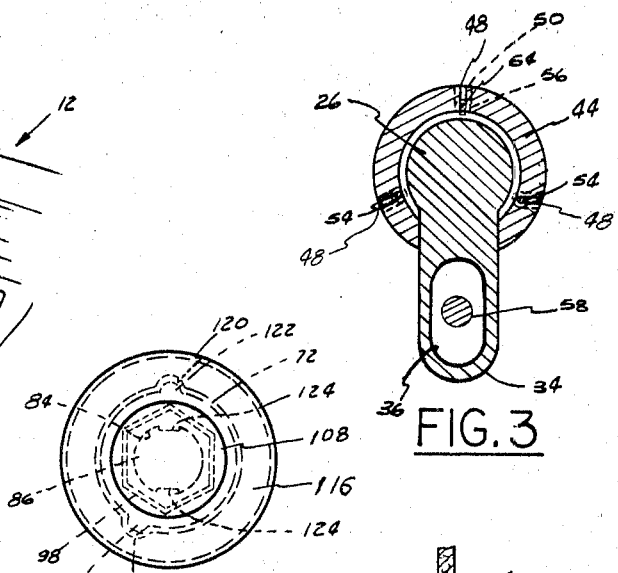
FIG.5
FIG.3
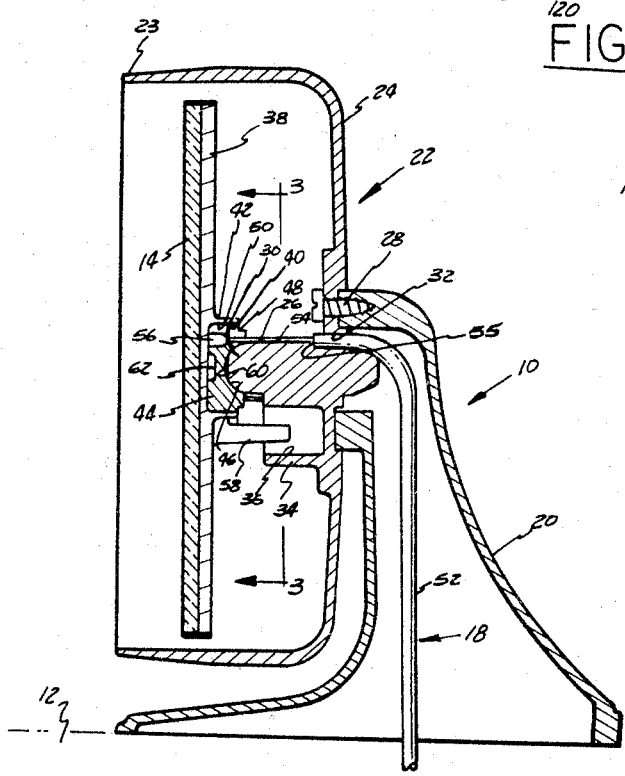
FIG.2
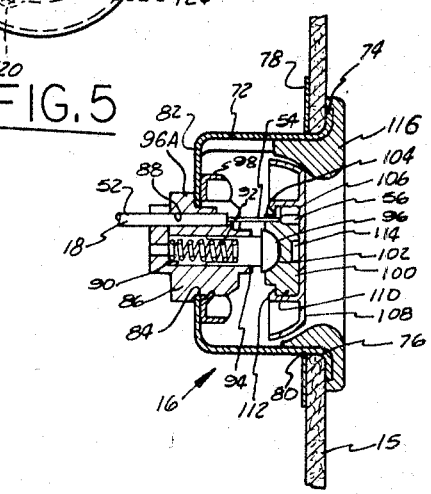
FIG.4
INVENTORS
FREDERICK A. BRAWNER
LAWRENCE H. SMITH
WILLIAM L. PRINGLE
BY Hauke, Kraus & Gifford
ATTORNEYS.

United States Patent Office 3,442,151
Patented May 6, 1969

3,442,151
REMOTE CONTROL APPARATUS
Frederick A. Brawner, Detroit, Lawrence H. Smith, Bloomfield Hills, and William L. Pringle, Grosse Pointe Shores, Mich., assignors to Lee Radke Associates, Inc., Detroit, Mich., a corporation of Michigan
Continuation-in-part of application Ser. No. 561,467, June 29, 1966. This application June 12, 1967, Ser. No. 645,155
Int. Cl. B60r 1/06
U.S. Cl. 74—501          10 Claims

ABSTRACT OF THE DISCLOSURE

A mirror assembly for automobiles or the like including a pivotally mounted mirror member, a remotely positioned pivotally mounted actuating member and a plurality of cables connecting the mirror member to the actuating member for mirror adjustment. The pivotal mounts on the mirror member and on the actuating member each comprise a similar member, and the pivotal actuating member is disposed substantially within the vehicle door surface for safety.

*Relationship to other applications*

The present application is a continuation-in-part application of Ser. No. 561,467 filed June 29, 1966.

*Background of the invention*

The present invention relates to a remote control device and more particularly to rear view mirror apparatus for automobiles and the like and means for positioning such mirror apparatus at a point spaced therefrom.

Automotive rear view mirrors of the type mounted on the fender or door of a vehicle have become practically universally accepted. Because these mirrors are normally, for purposes of visibility, inconveniently positioned for manual adjustment by the operator of the vehicle in his driving compartment and because there are differences in individual preferences and requirements for positioning such mirrors for different operators and there is a tendency for such mirrors to be jarred out of adjustment during operation of the vehicle, many attempts have been heretofore made to provide an apparatus for remotely adjusting the mirror element for optimum visibility. It is of course desirable that the operator can re-adjust the mirror without having to lower the window or extend his hand outside of the vehicle to manipulate the mirror element. Further the mirror assembly is positioned on the passenger side of the automobile or on the left front fender out of the reach of the operator and so unless some type of remote control apparatus is provided it is impossible to adjust such mirrors from inside the vehicle.

Various approaches have been made in the past to provide apparatus for remotely controlling the position of a rear view mirror fixed to an exterior section of the automobile such as the door or fender. Efforts to achieve remote adjustability in the prior art have included various kinds of remote control mechanism which employ gearing arrangements to achieve the control. These while functioning satisfactorily have proven to be too expensive for commercial success.

Another approach to achieve this objective has been to utilize a plurality of cables which are connected to a mirror holding element at one end and to an operator control element at the opposite end. Normally the operator manipulates the control element, and the motion of the control element is transmitted through the cables to the mirror holding element. Because of the savings over gearing arrangements this type of motion transmitting apparatus for rear view mirrors has been popular in recent times. However, although the mirror element can be readily adjusted through the use of such cables, other problems have arisen. The ability of the mirror to maintain the adjusted position under varying environmental forces such as vibrations of the vehicle due to road conditions, wind forces and the like has not been to the extent desired.

Another major problem inherent with conventional control apparatus for remotely positioned rear view mirrors lies in utilizing cables with the method of assembly which has been heretofore necessary. Heretofore it has been necessary to connect the ends of the operating cables to the mirror housing prior to attaching the mirror glass to the housing. The housing normally has a somewhat dished configuration provided with an aperture associated with each of the cables. The cables are threaded through the apertures and provided with an enlarged end disposed within the housing. The periphery of the housing is then flanged by a turning process to the retained mirror element and a felt backing member.

There are several problems with this type of construction. First, the apertures in the housing to accommodate the cable ends provide a source of water leakage into the housing and behind the mirror which contributes to the deterioration of the mirror element. Secondly, the combination of the mirror member and the cables is difficult to assemble in the frame of the automotive vehicle since there is a hazard of shattering the mirror as the attached cables are threaded through the various openings in the vehicle from the fender section to the operator controlled member in the occupant compartment. Thirdly, the particular manner of fastening the mirror to the housing or backing member has heretofore required a rotation of these two members and with the prior constructions the manner of connecting the cables to the mirror has required that this be done with the cables attached. This has produced a difficult manufacturing operation.

The structure of the remote control apparatus illustrating a preferred embodiment of the present invention obviates the problems of assembly encountered in conventional remote control apparatus. This improved result is achieved by providing a mirror housing in which the ends of the cable are connected to the mirror by means of an open-ended slot provided on the back of the mirror and which runs transversely to the direction of the cable. Each cable is provided with an enlarged end which readily slips into the slot. Further, the particular construction illustrated utilizes a method of attachment between the mirror and its backing member which does not require turning of these members.

By eliminating the apertures in which the operating cables are normally attached to the mirror housing, the water proof integrity of the housing is maintained, thus increasing the effective life of the mirror element. Furthermore, by providing a releasable connection between the cable ends and the mirror housing, the cables can first be separately threaded in the vehicle body and then their ends connected to the mirror housing, thus assuring a quicker installation and thereby precluding the hazard of the mirror element being damaged in the assembly operation.

The assembly operation is further improved by the fact that cables of the present invention are of equal length and are interchangeable thus reducing the manufacturing costs inherent in conventional control cables wherein the cables heretofore have been of dissimilar lengths.

The control apparatus of the present invention also provides for a readily adjustable mirror element which is responsive to manipulation of the control cables and wherein the stability of the mirror is solely dependent on the control cables. This improved stability of the present invention is achieved by providing a mirror housing with a rearwardly extending portion having a substantially hemispherically curved convexly formed end. This end is seated in a hemispherically shaped concavely formed socket member provided in a member fixed to the backing element for the mirror. The mirror is mounted for universal movement with respect to the body element by mating the respectively hemispherically shaped surfaces and joining the two members together by means of the cables. The cables are mounted at their actuating end through a spring means to assure that the mating hemispherically formed supporting surfaces will in all positions be snugly joined to one another. The spring mounted connecting means assures that the mirror member will be stable in all positions and under extreme operating conditions.

Another major drawback in conventional remote control apparatus lies in the configuration of the operator control member, which normally takes the form of an actuating post which extends from the surface of an interior section of the vehicle such as the door panel or the dashboard. The operator of the vehicle normally manually grips this actuating post and by manipulating the post achieves the desired positional alignment of the mirror element. However, numerous studies made in recent years regarding the cause of injuries to the occupants of vehicles involved in accidents where the vehicle experiences a sudden sharp deceleration in its forward rate of travel, indicate that many injuries are caused by a sudden change in the occupant's relative position within the vehicle which causes the occupant to come into contact with various projecting members disposed within the interior of the vehicle. Projecting members of this character include functional members such as gearshift levers, interiorly mounted rear view mirrors, and actuating handles and knobs and the like such as those used for remote control actuation of outside mirrors.

The present invention provides an actuating member in the form of a recessed mounted button so that the danger of injury from this source is eliminated. The particular construction of the actuating assembly provides precise manipulation of the mirror by manipulation of the pivotally mounted button.

It is an object then of the present invention to provide an actuating member which does not extend into the compartment of the vehicle to present a potential injury producing object to the occupants of the vehicle.

It is another object of the present invention to improve remotely controlled mirror assemblies by providing a releasable connection between the ends of the cables for such assemblies and the mirror housing so that during installation the cables may be first assembled within the body and then connected to the mirror housing.

It is another object of the present invention to increase the life of exteriorly mounted remotely controlled automotive rear view mirrors by providing a mirror of this type in which the operating cables are joined to a connection formed on the exterior of the backing member thereby eliminating the requirement for apertures in the backing member associated with the cables through which water or other foreign matter can enter.

It is further an object of the present invention to improve the stability of exteriorly mounted remotely operated rear view mirrors by providing a mirror housing having a hemispherically formed ball portion extending toward the body of the mirror and which fits in a socket member formed in the backing element for the mirror and including spring means urging the ball and socket member toward one another so that the ball and the socket will fit snugly together in all relative positions between the mirror element and the ball.

It is another object of the present invention to substantially reduce the cost of manufacturing and assembling remote control mirrors by providing such a mirror constructed of a minimum number of different parts, and in which the mirror element is joined to a backing member by adhesive, and in which a single spring element is used to urge the mating surface of the mirror element and its support as well as the actuating button and its support into snug contact.

Still further object and advantages of the present invention will readily occur to one skilled in the art to which the invention pertains upon reference to the following detailed description which makes reference to the accompanying drawings and in which like reference characters refer to like parts throughout the several views and in which:

FIG. 1 is a perspective view illustrating a remotely controlled rear view mirror assembly embodying the present invention mounted on the left front door on an automotive vehicle and controlled by an operator control member mounted in the interior door panel of the vehicle, FIG. 2 is an elevational cross-sectional view taken through the mirror assembly illustrated in FIG. 1, FIG. 3 is a sectional view taken along lines 3—3 of FIG. 2, and FIG. 4 is a sectional view taken through the control member illustrated in FIG. 1, FIG. 5 is a plan view as seen from the right hand side of FIG. 4.

Description

Now referring to the drawings for a more detailed description of the present invention a mirror assembly generally indicated at 10 is shown in FIG. 1 as mounted on the left front door of an automotive vehicle 12. It will be apparent as the description proceeds that the mirror assembly 10 could also be mounted on the right door of the vehicle or on either front fender of the vehicle. The mirror assembly 10 preferably includes a mirror element 14 facing rearwardly to provide a view for the operator of the vehicle of conditions to the side and rear of the vehicle 12. The mirror element 14 is adjusted for alignment in response to a manipulative movement by the vehicle operator of a control assembly 16 preferably mounted in the door panel 15 of the vehicle 12 and which movement is transmitted through a plurality of control cables 18 to the mirror element 14.

Referring now to FIG. 2 the mirror assembly includes a hollow riser member 20 which supports a mirror housing or base 22 upon a convenient supporting section of the automobile vehicle 12 such as the front door or the front fender. The riser member 20 is preferably secured to the vehicle door or fender in the conventional manner such as by screws or by brackets (not shown).

The housing 22 can be of any desired configuration but in the embodiment shown is generally circular and dished and has an open end 23 and a back wall section 24 provided with a centrally located mirror supporting section 26. A plurality of annularly spaced self-tapping screws 28 mount the housing 22 to the riser member 20.

A substantially hemispherically shaped, convexly formed end portion 30 is formed in the rearwardly facing end of the supporting section 26. Counterbored apertures 32, only one of which is illustrated in FIG. 2, are radially spaced from the axis of the supporting section 26 and preferably angularly spaced at about 120 degrees so that three of such apertures are preferably provided through the back wall section 24. As can best be seen in FIG. 3, the supporting section 26 is also provided with a portion 34 forming a rearwardly facing pocket 36 preferably disposed below the main portion of the supporting section 26 and intermediate a pair of the apertures 32.

Referring again to FIG. 2, the mirror element 14 is illustrated as being circular in configuration and is carried on the rearwardly facing surface of a circular backing element 38. The preferred means of mounting the mirror element 14 to the backing element 38 is by a suitable adhesive. This eliminates the problems encountered when such elements are mounted by the more conventional means such as by turning the members together while bending the outer edge of the backing element around the outer edge of the mirror element.

The backing element 38 is provided with a forwardly facing centrally disposed pocket 40 formed by a substantially circular wall 42. A first member 44 is mounted in the pocket 40 preferably by a suitable adhesive being applied to the portions of the backing element 38 forming the pocket 40 and the rearwardly facing surfaces of the member 44.

The member 44 is provided with a forwardly facing, substantially hemispherically formed concavely shaped surface 46 which mates with the convexly formed end portion 30 of the supporting section 26.

As can best be seen in FIGS. 2 and 3, the member 44 is provided with a plurality of equally angularly spaced slots 48 which open at their rearward ends to enlarged pockets 50. The slots 48 and corresponding pockets 50 coincide with the apertures 32 and together provide the means for mounting the cables 18 in an actuating relationship to the mirror element 14. As best illustrated in FIG. 2, the cables 18 each preferably comprise an outer housing section 52 and an inner core 54 movable axially within the housing 52. The apertures 32 receive the housing 52 and an abutment 55 formed in the support section 26 abuts the end of the cable housing 52 to maintain it in a fixed position with respect to the support section 26. The end of the core 54 is provided with an enlarged end piece 56 adapted to be received in the pocket 50 and to prevent the core 54 from moving out of the slot 48, so that movement of the core 54 axially within the housing produces a pivoting of the mirror element about the end portion 30.

The backing element 38 is also provided with a forwardly extending finger 58 adapted to extend into the pocket 36 and to thereby prevent rotation of the backing element 38 and the mirror 14 about the end portion 30.

It is apparent then that since the housings 52 of the cables 18 are normally fixed with respect to the supporting section 26 their respective cores 54 may move in response to a manipulative movement applied to the control assembly 16. Furthermore, since the cores 54 are connected to the member 44 which is in turn fixed with respect to the mirror element 14 at approximately 120 degree intervals, movement of the cores 54 will produce a corresponding movement of the mirror element 14 about the end section 30 of the supporting section 26 into various selective positions according to the desires of the operator. If desired, a portion 60 of the end of the supporting section 26 can be removed as shown in FIG. 2 to provide a more friction-free pivotable movement of the mirror member about the supporting section 26 and for this same purpose the member 44 can be constructed of a low friction material such as Teflon. Also, a pocket 62 can be provided in the member 44 to receive any excess adhesive applied to the mating surfaces of the backing element 38 and the member 44 during the joining thereof.

Now referring to FIG. 4, the control assembly 16 is illustrated as being preferably mounted to a door panel section 15 of the vehicle 12 and preferably includes a substantially cylindrical cup 72 having a radially outwardly extending flange portion 74 at its open end. The cup 72 is adapted to be inserted through a suitable substantially circular opening 76 provided in the door panel 15 and to be mounted in position by means of a lock ring 78 disposed on the interior side of door panel 15. The lock ring 78 is of conventional construction and is provided with teeth 80 which frictionally engage the exterior surface of the cup 72 when it is pushed over the cup to thereby draw the flange 74 of the cup up tight against the exterior surface of the door panel 15. The bottom 82 of the cup 72 is provided with a centrally disposed substantially circular opening 84 which receives a support member 86.

The support member 86 is provided with equally angularly spaced bores 88 for receiving the cables 18 and a substantially centrally disposed outwardly facing bore 90.

The bore 90 provides the means for carrying a spring 92 which urges a member 94 outwardly. The member 94 is provided with a substantially hemispherically formed convexly shaped surface 96. The member 86 is preferably secured to the cap 72 by means of a flange portion 96A formed in the exterior surface of the member 86 and a self-tapping nut member 98 adapted to threadably engage the exterior surface of the member 84 interiorly of the cup 72.

A supported member 100 is formed with a substantially hemispherically formed concavely shaped surface 102 to be pivotally supported on the surface 96 of the member 94. The supported member 100 is identical to member 44 and is therefore provided with a plurality of equally angularly spaced slots 104 and pockets 106 adapted to receive the enlarged end portion 54 of the cables 18. The housings 52 of the cables 18 are fixed to the member 86 by means of abutments formed at the interior ends of the bores 88.

The supported member 100 is adapted to receive a substantially circular actuating button 108 having an inwardly facing circular pocket 110 adapted to receive the member 100. An inwardly facing flange 112 locks to an interior surface of the member 100 to thereby lock the members together. If desired, the joining of the members 100 and 108 can be made more secure by providing a suitable adhesive to the mating surfaces and for this purpose a pocket 114 is provided in the member 100 to collect any excess adhesive. Again a portion of the surface 96 may be removed as illustrated in FIG. 4 to aid in promoting pivotable movement between the supported member 100 and the surface 96, and either or both of these members can if desired be made of a suitable low friction material such as Teflon.

As can best be seen in FIG. 5, the opening 76 is preferably formed with unequally spaced enlarged portions 120 and the cup 72 is formed with similar mating enlargements 122 to assure a proper rotated positioning of the cup 72 with respect to the door 15. Likewise the member 86 and the opening 84 are provided with mating sections 124 of different dimensions which locate the proper rotated position of the member 86 with respect to the cup 72. These locating means provide the means for properly positioning each of the members with respect to the other so that the cables will be in the proper position to produce an actuation of the mirror element 14 which corresponds directly to the same relative movement of the actuating button 108. The spring 90 in combination with the cables 18 urges the surfaces 96 and 102 into supporting pivotable engagement and this spring acting through the cables 18 also urges the surfaces 46 and 30 into a secure pivotable relationship.

A cover 116 can be secured in place by a suitable adhesive and is disposed outwardly of the recessed button 108 to conceal the inner mechanism and parts of the actuating assembly 16.

It is apparent that a construction has been provided which produces a remotely controllable rear view mirror assembly which can be manufactured at a much lower cost than heretofore possible and which can be installed much more economically and conveniently than with the prior art assemblies.

The particular construction permits the parts to be shipped substantially in disassembled form and to be assembled while being installed. The cup 72 and member 86 are preassembled with the cables 18 in place by means of the self-threading nut 98. This assembly is installed in a door panel 15 or other convenient place by means of the lock ring 78. The mating sections 124 and the enlarged portions 122 assure that the cup 72 and the support member 86 will be positioned in the proper rotated position to properly locate the cables 18. This is necessary to assure that actuating of the button in one area will produce a similar actuation of the mirror element 14. With the member 94 and spring 90 in place the supported member 100 is positioned over the surface 96 and the cores 54 of the cables 18 are inserted through the slots 104 to bring the enlarged ends 56 of the cables into locking engagement in the pockets 106.

The remote control assembly 16 can now be left and the mirror 10 mounted in position. It is apparent of course that these two steps can be done at the same time by different workers. The riser 20 is mounted to the vehicle door or fender in the usual manner by brackets, screws or the like (not shown). When the mirror riser 20 is in the properly secured position the housing 22 is fixed to the riser 20 by means of the self-tapping screws 28. The cables 18 are then brought through the apertures 32 and the ends 56 are positioned within the pockets 50 by bringing the cores 54 through the slots 48 substantially in the manner described with respect to the actuating assembly 16. When all of the cable ends 56 are thus inserted within the pockets 50 the supporting member 44 is disposed over the end portion 30 of the supporting section 26. The spring 90 permits some resilient movement between these members to permit the desired positioning.

When this has been completed button 108 can be fixed to the member 100 by a suitable adhesive and the mirror element 14 and its backing member 38 which have already been secured together by a suitable adhesive can also be mounted to the member 44 by an adhesive. The cover 114 then can be glued or similarly adhered to the cup 72.

It is apparent then that a mirror has been described which is positioned in response to manipulative movement by an operator-controlled button 108 and which movement is transmitted through the cables 18 which are connected to the mirror element 14 in a manner which permits the cables to be separately assembled with the vehicle and then separately assembled and connected to the actuating assembly and the mirror assembly. It can be further seen that a button 108 has been described which is recessed within its housing 114 so that it eliminates the possibility of an injury producng hazard to an occupant of the vehcle in the event of a sudden deceleration of the vehicle.

It is also apparent that although we have described but one embodiment of our invention many changes and modifications can be made therein without departing from the spirit of the invention as expressed by the scope of the appended claims.

Having thus described our invention we claim:

1. Positioned control apparatus for a remotely supported member, useful in positioning an automotive rear view mirror spaced from the operator, said apparatus comprising,
   (a) a base and means mounting said base to a vehicle or the like,
   (b) a first member, a mirror mounted to said first member, and means for pivotally coupling said first member to said base,
   (c) said coupling means comprising said first member having a partially spherical, concavely curved surface, said base having a partially spherical, convexly curved surface corresponding to said concavely curved surface and means urging said surfaces into engagement,
   (d) a second member and a support for said second member disposed remotely from said first member, and means for supporting said second member for universal movement about a pivot point associated with said support,
   (e) at least one cable connecting said first member to said second member to transmit pivotal movement of said second member to said mirror,
   (f) said support defining a recess and said second member being disposed substantially entirely within said recess and being operable upon being manually pivoted to move said cable and thereby pivot said first member about said base.

2. The apparatus as defined in claim 1, and in which said last mentioned means comprises said second member and said support being provided with complementary partially spherical surfaces and means urging said surfaces into engagement.

3. The apparatus as defined in claim 1, wherein said last mentioned means comprises said second member having a partially spherical, concavely curved supporting surface, said support having a partially spherical convexly curved surface corresponding to said concavely curved surface and including resilient means operative to supportably urge said convexly curved surface against said concavely curved surface and permitting universal relative movement between said second member and said support.

4. The apparatus as defined in claim 1, and wherein the connection between said first member and said cable comprises,
   (a) an enlargement fixed to the end of each of said cables,
   (b) said one of said members having open-ended slots associated with each of said cables and opening substantially transversely to the direction of the associated cable and said slots each defining an opening greater than the thickness of said cables but less than the thickness of said enlargement.

5. The apparatus as defined in claim 1, including at least three cables, said second member having an open-ended slot corresponding to each of said cables arranged in an equiangular disposition about a common axis passing through said pivot point and each of said cables having an enlarged end adapted to be releasable secured in each of said slots so that said cables cooperate in positioning said second member about said pivot point.

6. The apparatus as defined in claim 1 and in which said first member and said second member are substantially identical in construction and are interchangeable.

7. The apparatus as defined in claim 2 and in which the diameters of said spherical surfaces of said first and second members are substantially equal.

8. Positional control apparatus for a remotely supported member, useful in positioning an automotive rear view mirror spaced from the operator, said apparatus comprising:
   (a) a base, and a first member, said base having a partially spherical, convexly curved supporting surface, and said first member having a partially spherical, concavely curved surface corresponding to said convexly curved surface, a mirror mounted to said first member and means supportably coupling said convexly curved surface to said concavely curved surface and permitting universal movement of said first member with respect to said base.
   (b) cable members, means mounting one end of said cable members to said first member and means at the opposite end of said cable members for remotely actuating said universal movement of said first member about said convexly formed surface of said base,
   (c) said mounting means comprising said cable members being provided with core sections and enlargements of their ends, said first member being provided with a plurality of slots for receiving the core sections of said cables by moving said cables toward the axis of said first member and registering with said slots, said enlargements being thereby received in said pockets whereby said cables can be connected to said first member by moving said cables into said slots and toward the center of said first member but movement along the axis of said cables prevents separation of said cables from said first member,
   (d) a second member substantially identical in shape to said first member and connected with the opposite end of said cables and a support for said second member disposed remotely from said first member, means for supporting said second member for universal movement about a pivot point associated with said support and (e) said support defining a recess and said second member being disposed substantially entirely within said recess and being operable upon being manually pivoted to move said cable and thereby pivot said first member about said base.

9. The apparatus as defined in claim 8, and in which said mirror comprises a mirror element and a backing element secured together by adhesive.

10. The apparatus as defined in claim 9, and in which said first member is secured to said backing element by an adhesive.

References Cited

UNITED STATES PATENTS

| 1,630,217 | 5/1927 | Rasor. | |
| 1,909,526 | 5/1933 | Falge et al. | 350—281 |
| 2,338,780 | 1/1944 | Poncher et al. | 350—307 X |
| 2,931,245 | 4/1960 | Jacobson | 74—501 |
| 3,046,841 | 7/1962 | Kawecki | 74—501 |
| 3,195,370 | 7/1965 | Smith | 74—501 |
| 955,521 | 4/1910 | Lovejoy | 74—501 |

FRED C. MATTERN, JR., *Primary Examiner.*

C. F. GREEN, *Assistant Examiner.*

U.S. Cl. X.R.

248—481; 350—307